United States Patent [19]

Ahad

[11] 4,328,934
[45] May 11, 1982

[54] SELF-ALIGNING INERTIA SENSOR ASSEMBLY

[75] Inventor: Munir J. Ahad, Valencia, Calif.

[73] Assignee: American Safety Equipment Corp., San Fernando, Calif.

[21] Appl. No.: 189,727

[22] Filed: Sep. 22, 1980

[51] Int. Cl.³ .................... A62B 35/02; B65H 75/48
[52] U.S. Cl. ............................................. 242/107.4 A
[58] Field of Search ................. 242/107.4 R–107.4 E; 297/478, 480; 280/806

[56] References Cited

U.S. PATENT DOCUMENTS

| | | | |
|---|---|---|---|
| 3,901,461 | 8/1975 | Stephenson et al. | 242/107.4 A |
| 3,930,622 | 1/1976 | Tanaka et al. | 242/107.4 A |
| 3,938,754 | 2/1976 | Stephenson et al. | 242/107.4 A |
| 3,938,755 | 2/1976 | Stephenson et al. | 242/107.4 A |
| 3,948,460 | 4/1976 | Kondziola | 242/107.4 A |
| 4,040,576 | 8/1977 | Walker et al. | 242/107.4 A |
| 4,077,584 | 3/1978 | Lafont | 242/107.4 A |

Primary Examiner—John M. Jillions
Attorney, Agent, or Firm—Poms, Smith, Lande & Rose

[57] ABSTRACT

A pendulum inertia sensor assembly for self-aligning the pendulum weight body in response to forward or rearward tilting of the retractor frame. A pendulum saddle is provided having an annular pendulum hanging surface which is inclined from a horizontal orientation. The pendulum head is cocked on the pendulum neck so that the saddle seating surface on the pendulum head seats entirely on the pendulum hanging surface while the pendulum weight body is suspended vertically below. As the retractor frame and pendulum saddle are tilted forward or rearward, the pendulum head rotates seatingly about the pendulum hanging surface as the pendulum weight is moved to its new vertical position. The saddle contact surface on the pendulum head and pendulum hanging surface on the saddle are made from low friction materials to allow low resistance rotation of the pendulum head during automatic adjustment and realigning of the pendulum body during retractor frame tilting.

12 Claims, 7 Drawing Figures

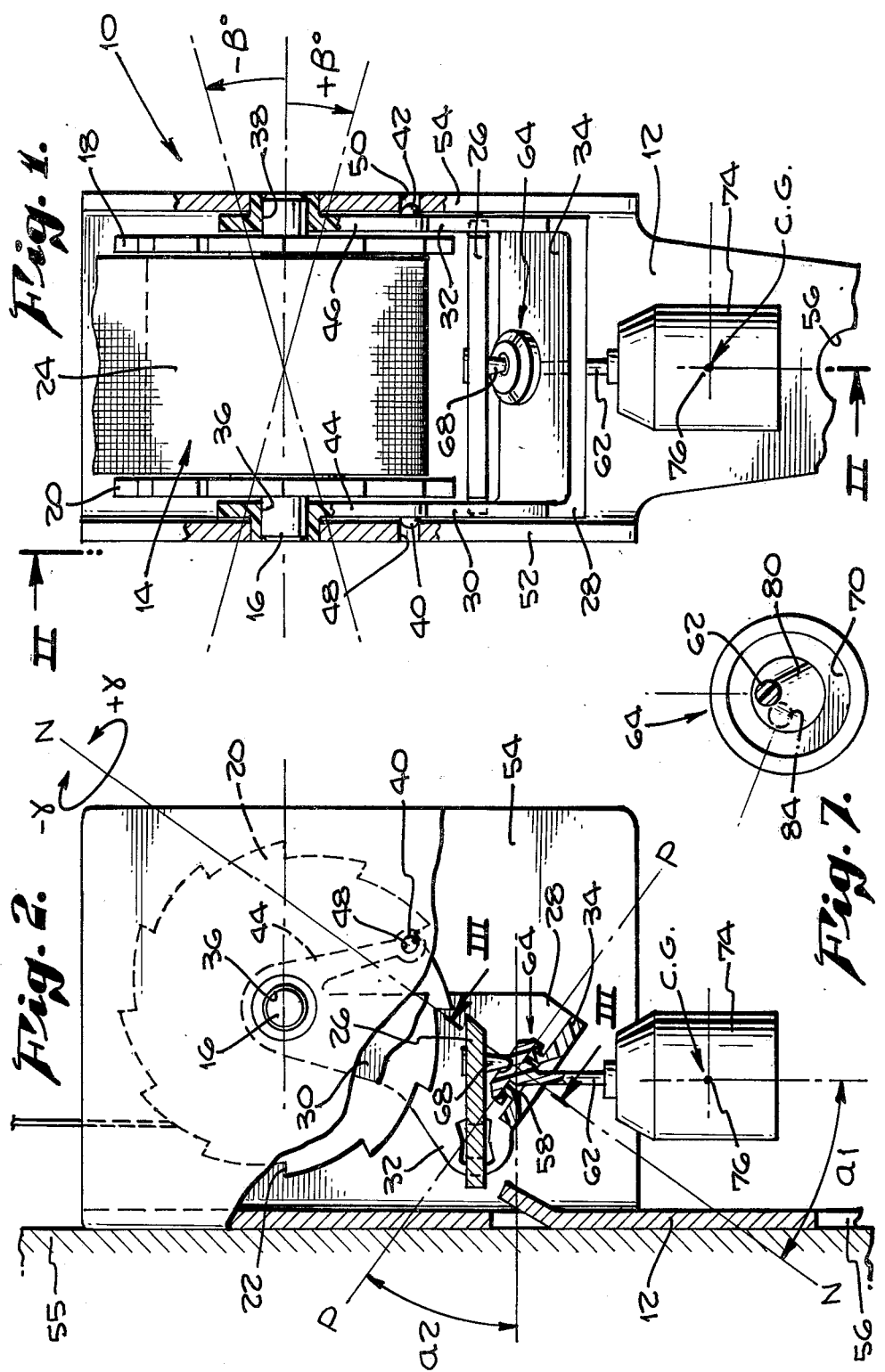

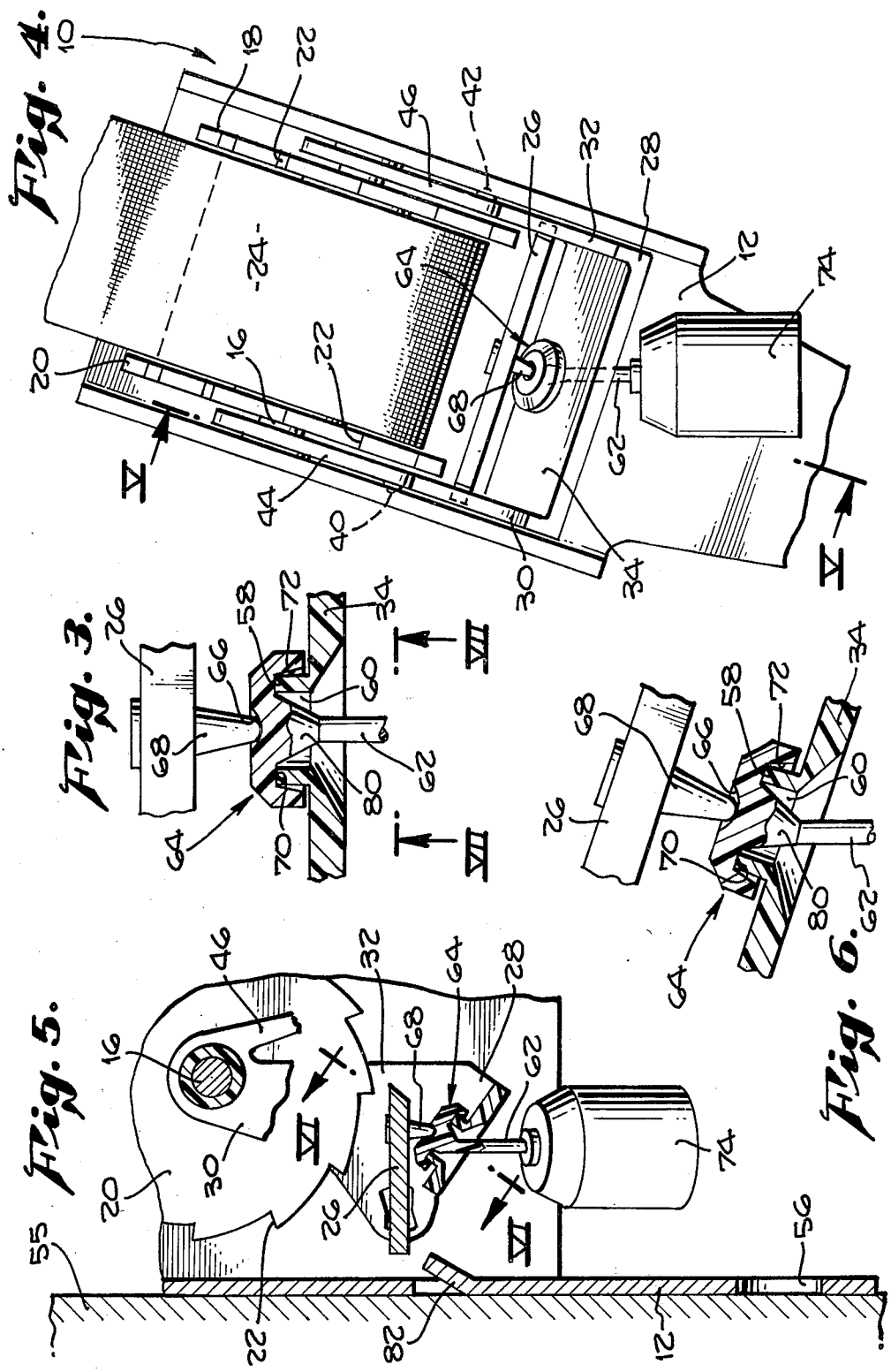

SELF-ALIGNING INERTIA SENSOR ASSEMBLY

BACKGROUND OF THE INVENTION

The present invention relates to inertia responsive seat belt retractors. More specifically, the present invention relates to inertia responsive retractors utilizing a hanging pendulum as the inertia sensor.

The hanging pendulum type inertia responsive seat belt retractor is a well-known seat belt retractor which is being used for occupant restraint in modern vehicles. In general, the hanging pendulum type retractor includes a pendulum saddle which has a hanging or seating surface from which is suspended a pendulum. These pendulums have a weight body which includes a neck that is connected to a head portion. The head portion seats or is hung from the pendulum saddle with the weight body being suspended vertically therefrom. During normal vehicle operation, the weight body remains suspended directly or vertically below the pendulum head. When the vehicle is subjected to extreme changes in velocity, such as the extreme deceleration encountered during accidents, the weight body swings away from its vertical position suspended below the pendulum saddle. As the weight body swings, the head portion nutates or is rocked about its seating engagement with the pendulum saddle. This nutation or rocking motion, lifts a suitably placed pawl to engage a ratchet wheel and thereby lock the retractor against unwinding movement. In this manner, the retractor belt wheel is freely rotating against its spring bias at all times except when the weight body swings in response to changes in velocity and thereby actuates the pawl into locking engagement.

An important factor in proper operation of hanging pendulum type retractors is the proper mounting of the pendulum saddle so that the pendulum may be hung vertically without rocking the pendulum head to cause inadvertent actuation of the locking pawl. Many different mechanisms have been devised to provide a self-adjusting means to compensate for possible differences in the pendulum saddle mounting orientations. These devices are characterized by complicated pivot assemblies utilizing ball bearings and universal fittings. Exemplary of such prior art attempts to provide a self-adjusting pendulum sensor assembly is U.S. Pat. No. 3,938,755 issued to Stephenson et al. on Feb. 17, 1976. The Stephenson patent discloses a self-adjusting pendulum sensor assembly employing a trunnion assembly which is adapted to pivot in two directions upon its swivel axis with reference to the pendulum saddle. Two other prior art patents (U.S. Pat. No. 3,938,754 and U.S. Pat. No. 3,901,461) both also issued to Stephenson et al., similarly disclose self-adjusting pendulum-type inertia sensitive devices based upon pivotal mounting of the pendulum assembly to allow pivoting to various compensating positions when the pendulum saddle is tilted to various mounting orientations.

Another attempt at providing a self-adjusting device to compensate for different pendulum saddle orientations is U.S. Pat. No. 4,077,584 issued to Lafont on Mar. 7, 1978. The Lafont patent is not based on the hanging pendulum but relies on the rolling of a ball bearing about a dished surface during changes in velocity to operate a lever which in turn operates a pawl to lock a belt reel. This device is a departure from the standard pendulum inertia sensor assembly and although providing a means for compensating for different pendulum saddle orientations, the need for a ball bearing and associated bowl or dish and socket joints is not as desirable as the simple and reliable hanging pendulum type inertia sensor assembly.

Although the above cited self-adjusting pendulum inertia sensor assemblies are suitable for their intended purpose, they still include many more complicated parts than the initial standard pendulum inertia sensor assembly. In the standard pendulum assembly, the pendulum head is mounted at right angles to the pendulum neck with the pendulum neck and weight body having a center of gravity directly below the center of the pendulum head. When the pendulum saddle is horizontally mounted, the pendulum head seats on the pendulum saddle with the weight body suspended vertically below.

It would be desirable to provide an inertia sensor assembly having the simplicity and reliability of the standard type pendulum inertia sensor assembly while at the same time including features allowing non-horizontal orientation of the pendulum saddle.

SUMMARY OF THE INVENTION

It is therefore an object of the present invention to disclose and provide a simple inertia sensor assembly which self-adjusts for non-horizontal orientation of the pendulum saddle without the need for complicated trunnions and ball bearing assemblies.

Another object of the present invention is to disclose and provide a inertia sensor assembly which automatically compensates for variations in the pendulum saddle orientations caused by vehicle loading differences and other factors.

The above objects and others are accomplished in accordance with the present invention by an improved inertia sensor assembly adapted to actuate a pawl to engage a belt reel to prevent unwinding of the belt reel during changes in velocity above a pre-determined amount. The improved inertia sensor assembly includes a pendulum saddle having a sideways inclined annular pendulum hanging surface. The inertia sensor assembly further includes a pendulum having a weight body with a rigid neck attached thereto. On the other end of the pendulum neck is attached the pendulum head. The pendulum head has an annular saddle contact surface for seating on the inclined pendulum hanging surface to thereby suspend the neck and weight body vertically beneath the pendulum saddle.

As in standard pendulum sensor assemblies, swinging of the weight body away from its normal vertical position in response to velocity changes above a predetermined amount causes the pendulum head to nutate or rock relative the inclined pendulum hanging surface and thereby actuate a pawl to lock the belt reel. In order for the saddle contact surface on the pendulum head to seat properly on the inclined pendulum hanging surface, means in accordance with the present invention are provided for mounting the pendulum head to the neck in cocked relation so that the saddle contact surface is seated on the pendulum hanging surface and said weight body is suspended vertically below, whereby forward or backward tilting of the pendulum saddle causes the cocked saddle contact surface to rotate seatingly on the pendulum hanging surface to thereby maintain the weight body vertically below the pendulum saddle.

A further feature of the present invention includes the provision of low friction pendulum hanging and saddle contact surfaces to allow low resistance rotation of the two surfaces relative each other as the weight body, in response to gravitational forces, seeks its vertical position during changes in horizontal orientation of the pendulum saddle.

A more complete understanding of the improvement in pendulum inertia sensor assemblies along with the appreciation of other features and attendant advantages of the present invention will become apparent as the invention becomes better understood by reference to the following detailed description when considered in conjunction with the accompanying drawings.

BRIEF DESCRIPTION OF THE DRAWING

FIG. 1 is a front view of a preferred inertia sensor assembly with the pendulum saddle untilted.

FIG. 2 is a sideview of FIG. 1 taken in the II—II plane.

FIG. 3 is a detailed front view of the pendulum head and pendulum hanging surface of FIG. 2 taken in the III—III plane.

FIG. 4 is a front view of the retractor and inertia sensor assembly as shown in FIG. 1 except the retractor is mounted in a tilted position.

FIG. 5 is a partial side view of FIG. 4 taken in the V—V plane.

FIG. 6 is a detailed view of the pendulum head and pendulum hanging surface of FIG. 5 taken in the VI—VI plane.

FIG. 7 is a view of FIG. 3 taken in the VII—VII plane.

DETAILED DESCRIPTION OF A PREFERRED EXEMPLARY EMBODIMENT

In FIG. 1, the preferred inertia sensor of the present invention is shown in place on a standard seat belt retractor, with the seat belt retractor being shown generally at 10. The retractor 10 includes a retractor frame 12 which is provided for mounting the belt reel shown generally at 14. The belt reel 14 is mounted to the retractor frame 12 by way of axle 16. The belt reel 14 includes side ratchet portions 18 and 20. The side ratchet portions 18 and 20 have ratchet teeth 22 as best shown in FIG. 2. The side ratchet portions 18 and 20 further guide and maintain seat belt 24 centrally on belt reel 14 during winding and unwinding operations.

The seat belt retractor 10 is of the well-known variety wherein a spring bias against unwinding of belt 24 is continually applied. The belt reel 14 is free-wheeling at all times against the spring bias, except when ratchet teeth 22 are engaged and locked by pawl 26. The ratchet teeth 22 are shaped so that engagement by pawl 26 can only prevent unwinding movement. The contact of pawl 26 with ratchet teeth 22 does not prevent winding movement of reel 14.

The pawl 26 is mounted fixedly on pendulum saddle 28. The pendulum saddle has side arms 30 and 32 which support cross member 34. The pendulum side arms 30 and 32 have mounting holes 36 and 38 respectively for mounting the pendulum saddle 28 to the retractor axle 16. Further, to prevent the pendulum saddle from rotating about axle 16, detents 40 and 42 are provided on extension portions 44 and 46 respectively of side arms 30 and 32. The detents 40 and 42 engage orifices 48 and 50 in retractor frame walls 52 and 54 respectively.

As shown in FIG. 2, the retractor frame 12 is mounted to a vertical vehicle support surface 55 by way of mounting bore 56. The vertical support surface on which the retractor frame 12 is mounted can be any suitable strong vertical surface in the vehicle such as support pillars, structurally reinforced side panels and the like.

Since most suitable vertical vehicle mounting surfaces will be located on the sides of the vehicle, the retractor frame 12 when mounted thereon can be tilted in a forward direction or a backward direction relative the vehicle. Although the tilting of the frame 12 relative the mounting surface 55 may be viewed as from side to side, this tilting movement will be hereinafter referred to as forward and backward even if the support structure is not on the side of the vehicle. Further, the retractor frame 12, when mounted securely on the vehicle sidewall cannot be tilted outward from the side wall. This outward tilting will hereinafter be referred to as sideways tilting, since it is sideways with reference to the vehicle when the retractor frame is mounted on a sidewall.

As shown in FIG. 1, the retractor frame 12 will be mounted vertically or straight up and down on the vehicle side wall 55. However, many times it is desirable to tilt the retractor frame 12 forward a certain number of degrees such as +beta degrees or to tilt the retractor frame backward such as —beta degrees. FIG. 4 shows the retractor frame 12 being tilted forward on the vertical vehicle mounting surface +beta degrees.

In accordance with the present invention, the pendulum saddle and pendulum are modified to provide automatic adjustment of the pendulum for any movement of the retractor frame through + or — beta degrees from vertical.

As shown in FIG. 2, the pendulum saddle cross member 34 is provided with an annular pendulum hanging surface such as raised annular rib 58. As best shown in FIGS. 3 and 6, the raised rib 58 defines an opening 60 through which the pendulum neck 62 passes. The pendulum head shown generally at 64 includes an upper recess 66 for receiving pawl actuation pin 68. Further, on the under side of pendulum head 64 is a saddle contact surface such as seating surface 70. The seating surface 70 is at the top of an inverted annular groove 72. The annular groove 72 is of sufficient size to seat over raised rib 58 to provide constant positioning of raised rib 58 against seating surface 70.

The pendulum saddle cross member 34 and raised rib 58 formed integrally therein is inclined from the standard horizontal position as best shown in FIGS. 2 and 5. The plane defined by the raised rib 58 is the PP plane which is tilted or inclined sideways alpha degrees from horizontal. Since the weight body 74 which is suspended from pendulum neck 62 is subjected to gravitational forces, it will always try to maintain its center of gravity 76 in a vertical orientation. If the neck 62 extends perpendicularly from the pendulum seating surface 70, as is common with standard pendulums, then when weight 74 is in the position shown in FIG. 2, the head 64 would be rocked or raised off of raised rib 58 and thereby move pawl 26 into engagement with ratchet teeth 22.

To prevent this unwanted actuation of pawl 26, means as particularly contemplated by the present invention are provided for cocking the pendulum head at an angle which is the same number of degrees as the angle of inclination of the raised rib 58. Specifically, the lower portion 80 of pendulum head 64 is shaped so that instead of mounting the pendulum head at right angles to neck 62, the pendulum head is cocked alpha degrees from the perpendicular position. As shown in FIG. 2, cocking the pendulum head 64 the same number of degrees that raised rib 58 is inclined, results in the seating surface 70 seating completely on raised rib 58 while weight body 74 is suspended below with the center of gravity in a vertical position.

When the retractor frame 12 is mounted as shown in FIGS. 1 and 2, the pendulum inertia sensor assembly of the present invention functions as a standard pendulum type inertia responsive retractor. The belt reel 14 is free wheeling at all times against a winding spring bias, except when weight 74 swings away from its vertical position in response to changes in velocity above a predetermined amount. Swinging of weight 74 causes pendulum head 64 to nutate or rock on the raised rib surface 58 thereby actuating pawl 26 into engagement with ratchet teeth 22. A stop tab 82 is provided on the frame 12 to brace pawl 26 against the extreme forces exerted on belt reel 14 and belt 24 during accidents. The pendulum support saddle 28 is neither designed nor intended to brace the pawl during retractor engagement.

When the retractor frame 12 is tilted forward beta degrees as shown in FIG. 4, the weight 74 also moves forward to re-establish its center of gravity in a vertical position. Since the pendulum head 64 and saddle seating surface 70 are not at right angles relative the neck 62, the seating surface 70 rotates about raised rib 58 the same number of degrees as the frame is tilted forward or backward. As the pendulum head rotates on the raised rib 58, the seating surface 70 remains seated entirely about the raised rib 58 to prevent undesired actuation of pawl 26. In FIG. 3, pendulum head 64 is shown when the frame is in the upright position. In FIG. 6, the pendulum head 64 is shown after it has rotated alpha degrees due to tilting the frame 12 as shown in FIG. 4. Another depiction of the rotation of pendulum head 64 is shown in FIG. 7. FIG. 7 shows the positioning of the neck relative the pendulum head 64 center when the frame is in the upright position. In phantom at 84, is shown the positioning of the neck after rotation of head 64 in response to movement of weight 74 during forward tilting of frame 12.

As will be realized, the present invention is a vast improvement over the complicated trunnion and ball bearing systems of prior art devices. By simply inclining the raised rib 58 relative to horizontal, and by accordingly cocking or tilting pendulum head 64 the same number of degrees, a simple self-adjusting pendulum sensor is provided. It should be noted, however, that the degree of tilt (+ or − beta) of retractor frame 12 is necessarily limited to the degree of inclination (alpha) of raised rib 58. For example, the pendulum head 64 will rotate about raised rib 58 to + or − alpha degrees in response to forward or rearward tilting of retractor frame 12. The limits of adjustment by pendulum head rotation will be exceeded if the pendulum frame 12 is tilted forward or rearward too far. In this case, the pendulum head 64 will rotate to a limit of alpha degrees and thereafter will nutate or rock off of its seated position on raised rib 58.

Although the preferred embodiment of the present invention has shown the retractor frame mounted vertically, the principle of the present invention may equally as well be applied to horizontally mounted retractor frames wherein the pendulum saddle is so positioned to hang the pendulum vertically therefrom. In this way, the self-adjusting pendulum sensor of the present invention will automatically adjust for forward or rearward mounting tilt, on nonhorizontal mounting surfaces and will also automatically adjust for forward or rearward tilting due to variations in vehicle loading.

The present invention does not provide for self-alignment of the pendulum for both forward and rearward and sideways tilting. For example, the pendulum inertia sensor shown in FIG. 1 will only compensate for forward or rearward tilting and will not compensate or automatically self-align for tilting of the retractor frame 12 away from its mounted position on the vehicle vertical surface 55. However, the pendulum saddle 28 may be rotated about axle 16 by simply moving the detents 40 and 42 away from their engagement with orifices 48 and 50 and thereby rotating the raised rib 58 to the desired inclined angle relative horizontal with the detents being snapped back into suitably placed orifices to secure the pendulum saddle in the desired adjusted position. In this way, the pendulum saddle may be adjusted initially for various vehicle surfaces which are not substantially vertical; however, the pendulum saddle will not self-align or automatically compensate for tilting of the mounting surface from side to side after initial adjustment of the pendulum saddle 28. The pendulum assembly in accordance with the present invention will only automatically compensate for forward and rearward tilting, while with regard to sideways tilting, the pendulum assembly responds the same as prior art standard right angle connected pendulum heads.

Since the pendulum saddle 28 does not have to brace the pawl 26 when it engages ratchet teeth 22, it may be made from any suitable lightweight material such as lightweight metal or plastic. Further, it is desirable that the raised rib 58 be made from a relatively smooth friction-free material such as smooth plastic or other smooth material. Also, the seating surface 70 on the bottom side of pendulum head 64 should also be made of a suitable smooth friction-free material such as plastic or the like so that rotation of seating surface 70 on raised rib 58 will be relatively friction-free thereby reducing any chance of binding to restrict rotation of the pendulum head 64. Lubrication may also be added to the raised rib 58 and seating surface 70 to further reduce friction during rotation.

Having thus described an exemplary embodiment of the present invention, it should be noted by those skilled in the art the within disclosures are exemplary only and that various other alternatives, adaptations and modifications may be made within the scope of the present invention. Accordingly, the present invention is not limited to the specific embodiments as illustrated herein.

What is claimed is:

1. In an inertia sensor assembly having a pendulum saddle with an annular pendulum hanging surface for vertically suspending a pendulum therebeneath, said pendulum having a weight body with a neck and head rigidly fixed to said neck, said head having a saddle contact surface for seating on said pendulum hanging surface to hang said weight body vertically therefrom, wherein movement of said weight body from its vertical position in response to changes in velocity rocks said saddle contact surface away from its seating engagement with said pendulum hanging surface to thereby actuate a pawl for locking a retractor reel when said weight body is moved beyond a predetermined distance from said vertical position, wherein forward or backward tilting of said pendulum saddle causes said saddle contact surface to rock relative said pendulum hanging surface as said weight body seeks a new vertical position below said tilted pendulum saddle, wherein the improvement in said inertia responsive assembly comprises:

inclining the pendulum hanging surface sideways; and cocking the head on said neck to the same degree as said pendulum hanging surface is inclined so that said saddle contact surface seats on said pendulum hanging surface and said weight body is suspended vertically below whereby when said pendulum saddle is tilted forward or backward, said saddle contact surface seatingly rotates on said pendulum hanging surface to maintain said weight body vertically below said pendulum saddle without rocking said pendulum head.

2. An inertia responsive assembly according to claim 1 wherein said pendulum hanging surface and said saddle contact surface are made from a low friction material to reduce rotation resistance as said surfaces rotate relative each other.

3. An inertia responsive assembly according to claim 1 wherein said retractor reel is mounted horizontally in a retractor frame which is mounted on a vertical vehicle surface.

4. A inertia responsive assembly according to claim 1 wherein said pendulum hanging surface is inclined at an angle relative said horizontal position and said saddle contact surface is cocked the same number of degrees whereby said saddle contact surface seats on said pendulum hanging surface and said neck and weight body are suspended vertically below.

5. An inertia sensor assembly adapted to actuate a pawl to engage a belt reel to prevent unwinding of the belt reel during changes in velocity above a predetermined amount comprising:

a pendulum saddle having a sideways inclined annular pendulum hanging surface; and a pendulum having a weight body with a rigid neck attached thereto, and a pendulum head having an annular saddle contact surface for seating on said inclined pendulum hanging surface to suspend said neck and weight body vertically beneath said pendulum saddle, whereby nutation of said pendulum head relative said inclined pendulum hanging surface caused by swinging of said weight body away from its normal vertical position in response to velocity changes above a predetermined amount actuates said pawl; and means for mounting said pendulum head to said neck in cocked relation so that said saddle contact surface is seated on said pendulum hanging surface and said weight body is suspended vertically below, whereby forward or backward tilting of said sideways inclined pendulum hanging surface causes said cocked saddle contact surface to rotate seatingly on said pendulum hanging surface to thereby maintain said weight body vertically below said pendulum saddle.

6. An inertia sensor assembly according to claim 5 wherein said belt reel is rotatably mounted on a reel axle, said reel axle being horizontally mounted to a retractor frame.

7. An inertia sensor assembly according to claim 6 wherein said retractor frame is mounted on a vertical surface, said pendulum saddle being mounted therein so that said inclined pendulum hanging surface is inclined outward from said vertical surface.

8. An inertia responsive assembly according to claim 5 wherein said pendulum hanging surface and said saddle contact surface are made from a low friction material to reduce rotation resistance as said surfaces rotate relative each other.

9. In an inertia sensor assembly adapted for use in a belt retractor, said belt retractor having a retractor frame and a belt reel rotatably mounted therein for winding and unwinding a belt wherein said inertia sensor assembly is adapted to actuate a pawl to releasably engage said belt reel in response to changes in velocity above a predetermined amount to prevent unwinding rotation of said belt reel, said inertia sensor assembly including a pendulum saddle having an annular pendulum hanging surface, said inertia sensor assembly further including a pendulum having a weight body with a center of gravity, a pendulum head having an annular saddle contact surface for seating on said pendulum hanging surface and a neck for rigidly connecting said pendulum head to said weight body wherein said pendulum head is connected at a right angle relative the axis passing through said neck and said center of gravity, whereby when said pendulum is hung from said pendulum hanging surface, said saddle contact surface seats on said pendulum hanging surface and said center of gravity is suspended vertically therefrom for swinging in response to changes in velocity, said swinging causing said pendulum head to nutate relative said pendulum hanging surface and thereby actuate said pawl, wherein the improvement comprises:

means for mounting said pendulum saddle to said retractor frame so that said pendulum hanging surface is tilted sideways; and means for rigidly connecting said pendulum head to said neck at an angle which is cocked from said right angle connection with said neck to the same degree as said pendulum hanging surface is tilted sideways, wherein said saddle contact surface remains seated on said pendulum hanging surface and said center of gravity remains suspended vertically therefrom, whereby when said pendulum hanging surface is tilted either forward or backward, said saddle contact surface rotates on said pendulum hanging surface to keep said center of gravity suspended vertically below said pendulum saddle.

10. An inertia responsive assembly according to claim 9 wherein said pendulum hanging surface and said saddle contact surface are made from a low friction material to reduce rotation resistance as said surfaces rotate relative each other.

11. An inertia responsive assembly according to claim 9 wherein said pendulum hanging surface is tilted sideways relative said horizontal position.

12. In an inertia responsive retractor assembly having a frame for mounting to a vertical mounting surface and a saddle fixed within said frame, said saddle including an annular pendulum hanging surface for hanging a pendulum assembly therefrom, said pendulum assembly having a weight body with a center of gravity, a head including an annular saddle contact surface and a neck for connecting the weight body to the head wherein the plane defined by said annular saddle contact surface is perpendicular to the axis of said neck, said axis passing axially through said saddle contact surface and passing through said center of gravity, the improvement comprising:
- means for mounting said pendulum hanging surface at an oblique angle relative said vertical mounting surface;
- means for mounting said head to said neck at an oblique angle relative said neck axis, said oblique angle being the same oblique angle as said pendulum hanging surface relative said vertical support surface, whereby said annular pendulum hanging surface and said saddle contact surface remain in contact along their entire surfaces by rotation relative each other when said frame is tilted on said vertical surface between said oblique angles on either side of vertical.

* * * * *